United States Patent
Kohara

(10) Patent No.: US 8,629,091 B2
(45) Date of Patent: Jan. 14, 2014

(54) LUBRICATING SYSTEM AND UNIVERSAL JOINTS WITH THE SYSTEM

(75) Inventor: Mika Kohara, Shizuoka (JP)

(73) Assignee: NTN Corporation, Osaka (JP)

( * ) Notice: Subject to any disclaimer, the term of this patent is extended or adjusted under 35 U.S.C. 154(b) by 506 days.

(21) Appl. No.: 12/449,713

(22) PCT Filed: Feb. 26, 2008

(86) PCT No.: PCT/JP2008/053224
§ 371 (c)(1),
(2), (4) Date: Aug. 21, 2009

(87) PCT Pub. No.: WO2008/105379
PCT Pub. Date: Sep. 4, 2008

(65) Prior Publication Data
US 2010/0099503 A1    Apr. 22, 2010

(30) Foreign Application Priority Data

Feb. 27, 2007 (JP) ................. 2007-047867
Feb. 27, 2007 (JP) ................. 2007-047889
Mar. 30, 2007 (JP) ................. 2007-090296

(51) Int. Cl.
*C10M 149/00* (2006.01)

(52) U.S. Cl.
USPC .................... 508/464; 508/551; 464/7; 464/8

(58) Field of Classification Search
USPC ............................ 508/464, 591, 551; 464/7, 8
See application file for complete search history.

(56) References Cited

U.S. PATENT DOCUMENTS

| 5,588,751 A | 12/1996 | Nakata |
| 2003/0022797 A1 | 1/2003 | Oohira et al. |
| 2005/0239963 A1* | 10/2005 | Kitano et al. .............. 525/88 |
| 2007/0179066 A1* | 8/2007 | Sakamoto et al. .......... 508/113 |

FOREIGN PATENT DOCUMENTS

| EP | 2 105 491 A1 | 9/2009 |
| JP | 06-41569 | 2/1994 |
| JP | 06-172770 | 6/1994 |
| JP | 06-173961 | 6/1994 |

(Continued)

OTHER PUBLICATIONS

EPO Search Report Dated Sep. 21, 2011.

*Primary Examiner* — Taiwo Oladapo
(74) *Attorney, Agent, or Firm* — Hedman & Costigan, P.C.; James V. Costigan; Kathleen A. Costigan

(57) ABSTRACT

The present invention provides a lubrication system that improves the force of retaining a lubricating component of a foamed lubricant, is capable of minimizing the amount of exudation of the lubricating component which occurs owing to deformation of the foamed lubricant, is capable of compensating for a lubricating function even when the lubricating component exudes insufficiently from the foamed lubricant, and is capable of complying with a demand that the lubrication system has a long life and can be produced at a low cost. The lubrication system comprises a foamed lubricant containing a lubricating component in a resin thereof which foams, hardens, and becomes porous and a grease for auxiliary lubrication which is present together with the foamed lubricant in a portion to be lubricated. The grease for auxiliary lubrication satisfies a condition that (1) a penetration thereof is not less than 175 and less than 285 or that (2) a mixing ratio of a thickener to the grease for auxiliary lubrication is not less than 10 wt % and less than 40 wt %. As shown in the drawings, a foamed lubricant (9) and a grease (10) for auxiliary lubrication are present together inside a universal joint.

7 Claims, 3 Drawing Sheets

(56) References Cited

FOREIGN PATENT DOCUMENTS

| | | |
|---|---|---|
| JP | 07-258433 A | 10/1995 |
| JP | 09-042297 | 2/1997 |
| JP | 10-158682 | 6/1998 |
| JP | 11-286601 | 10/1999 |
| JP | 2000-319681 | 11/2000 |
| JP | 2002-129183 | 5/2002 |
| JP | 2005239898 A * | 9/2005 |
| JP | 2006-077073 | 3/2006 |
| JP | 2007-177226 | 7/2007 |
| JP | 2007-247887 | 9/2007 |
| WO | WO 2007-063881 | 6/2007 |
| WO | WO 2007063881 A1 * | 6/2007 |
| WO | WO 2008-001880 | 1/2008 |

* cited by examiner

LUBRICATING SYSTEM AND UNIVERSAL JOINTS WITH THE SYSTEM

TECHNICAL FIELD

The present invention relates to a lubrication system capable of supplying a lubricant to a sliding portion of a machine and a rotating portion thereof and universal joints with the lubrication system.

BACKGROUND ART

Generally the lubricant is used at the sliding portion and the rotational portion of cars and most machines represented by industrial machines. The lubricant is classified into a liquid lubricant and a solid lubricant. Grease having a configuration-holding performance brought about by thickening lubricating oil and a solid lubricant which holds the liquid lubricant and is thus capable of preventing the liquid lubricant from scattering and dripping are known.

For example, known solid lubricants (see patent documents 1 through 3) formed by mixing the ultra-high-molecular-weight polyolefin or the urethane resin and the hardener with the lubricating oil or the grease have the property of gradually exuding the liquid lubricating component with the liquid lubricating component kept retained between molecules of the resin. The self-lubricating polyurethane elastomer formed by allowing reaction between the polyol which is a polyurethane material and the di-isocyanate in the lubricating component in the presence of the lubricant is also known (see patent document 4).

When these solid lubricants are enclosed in a bearing and solidified, the lubricating oil is gradually exuded therefrom. These solid lubricants are intended to eliminate the need for maintenance for replenishing the lubricating oil and be utilized to prolong the life of the bearing in a strict environment where a large amount of water is present and environment where a high inertial force acts.

In recent years, cars have come to have a high performance, be compact, and be lightweight. Thus a constant velocity universal joint used to transmit a driving force is increasingly demanded to have a long life in addition to the above-described performances. Because cars have become compact and lightweight, a high load is applied to the constant velocity universal joint. Therefore there is a case in which lubrication with the conventional grease is incapable of allowing the constant velocity universal joint to have a sufficiently long life. Because cars will be demanded to have a higher performance in the future, it is difficult to fully cope with the above-described problems by merely optimizing the enclosing amount of the grease and the kind of the additive. Therefore there is a growing demand for research and development of new lubricants and lubricating mechanisms to be used for the driving portion and the like of the constant velocity universal joint.

Regarding the above-described demand, the conventional solid lubricants proposed in the patent documents 1 through 4 have a large lubricant-holding force, but have problems that they lack flexible deformability. When the solid lubricant is used at portions such as the driving portion of the constant velocity universal joint where an external force such as compression, flexure, and the like is repeatedly applied at a high frequency, a very large force is necessary to deform the solid lubricant in conformity to the compression, flexure, and the like. Because a very high stress is applied to the solid lubricant, it is necessary for a portion retaining the solid lubricant to have a high mechanical strength.

The strength of the solid lubricant and the filling rate thereof make compensation for each other. Therefore it is difficult to hold the lubricant at a high filling rate. Thus there is a possibility of preventing the constant velocity universal joint from having a long life. Therefore there is a demand for the development of a solid lubricant which can be easily used at the portion to which the external force such as compression, flexure, and the like is repeatedly applied at a high frequency.

To comply with such a demand, the foamed (solid) lubricant is known in which the flexible resin foamed to form communicating pores therein is impregnated with the lubricating oil so that the lubricating oil is retained in the communicating pores (see patent document 5). The solid lubricant is compressed in conformity to the boot which is deformed by the flexure of the constant velocity universal joint. The liquid lubricant which has exuded from the solid lubricant owing to compression is supplied to a necessary portion to allow preferable lubrication.

But the method of impregnating the resin with the lubricant disclosed in the patent document 5 is of a later-impregnation type of impregnating the foamed resin with the lubricating oil. When the above-described foamed (solid) lubricant is used, it has a low lubricating oil-retaining force because the lubricating oil is not contained in the solid component. Thus the above-described impregnation method has a defect that the lubricating oil goes out at once from the foamed resin, when the foamed (solid) lubricant is used in a high-speed operation condition. The above-described material can be used for lubrication in a short period of time and in a closed space. But it is difficult to use the material for a long time and in an open space. In addition, because the material does not have a high oil-retaining force, the lubricant always flows in the space, while the discharge of the lubricating oil and the absorption thereof to the foam are repeated. In such a case, in dependence on the chemical property of the lubricant and that of an additive contained therein, there is a possibility that they attack and deteriorate the boot material of the universal joint. Thus the foamed lubricant is defective in that one of the materials is limited to a specific kind. In addition, it is impossible to avoid a later impregnation-caused increase in the number of production steps, an increase in the production period of time, and consequently an increase in the cost.

For the above-described reason, there is a demand for the development of the foamed (solid) lubricant having a high force of retaining the lubricant and permitting a large deformation. It is particularly necessary for a solid component to contain the lubricant therein to enhance the force of retaining the lubricant.

Such a foamed lubricant can be supplied to a necessary portion in a necessary amount better than grease lubrication industrially widely used. Therefore the art of allowing the solid component to contain the lubricating component therein has advantages of decreasing the cost owing to a decrease in the use amount of grease, decreasing a load to be applied to the material for the boot, decreasing the weight of the constant velocity universal joint, and making the constant velocity universal joint compact. Thus it can be safely said that this art is high in the degree of importance for society not only from the standpoint of an economic side, but also from the standpoints of a decrease in a load to be applied to environment and an increase in the degree of freedom in design.

Even in the constant velocity universal joint in which the foamed lubricant having the above-described many advantages is enclosed, in dependence on the manner of using them, there is a case where a discharge amount of the lubricant is small due to an external force and a rise of temperature. In consideration of durability, it is desirable that the discharge amount of the lubricating component from the resin component is necessity minimum. When the discharge speed of the lubricating component is low, a necessary amount of the lubricant reaches the sliding portion at a low speed. Thereby the lubricant runs dry, which may cause wear and defective lubrication to occur at the sliding portion.

Patent document 1: Japanese Patent Application Laid-Open No. 6-41569
Patent document 2: Japanese Patent Application Laid-Open No. 6-172770
Patent document 3: Japanese Patent Application Laid-Open No. 2000-319681
Patent document 4: Japanese Patent Application Laid-Open No. 11-286601
Patent document 5: Japanese Patent Application Laid-Open No. 9-42297

DISCLOSURE OF THE INVENTION

Problems to be Solved by the Invention

The present invention has been made to cope with the above-described problems. It is an object of the present invention to provide a lubrication system that improves the force of retaining a lubricating component of a foamed lubricant, is capable of minimizing the amount of exudation of the lubricating component which occurs owing to deformation of the foamed lubricant, is capable of compensating for a lubricating function, even when the lubricating component exudes insufficiently from the foamed lubricant, and is capable of complying with a demand that the lubrication system has a long life and can be produced at a low cost; and universal joints with the lubrication system.

Means for Solving the Problems

In the lubrication system of the present invention comprising a foamed lubricant containing a lubricating component in a resin thereof which foams, hardens, and becomes porous and a grease for auxiliary lubrication which is present together with the foamed lubricant in a portion to be lubricated, the grease for auxiliary lubrication satisfies a condition that (1) a penetration thereof is not less than 175 and less than 285 or that (2) a mixing ratio of a thickener to the grease for auxiliary lubrication is not less than 10 wt % and less than 40 wt %. The penetration shows a 60-time worked penetration measured in accordance with JIS K 2220 5.3.

In the foamed lubricant of the lubrication system of the present invention, the resin which foams, hardens, and becomes porous has rubber-like elasticity; and the lubricating component contained in the resin has an exuding property caused by deformation of a rubber-like elastic substance.

The resin which foams, hardens, and becomes porous is polyurethane resin.

An open cell ratio of the resin which foams, hardens, and becomes porous is not less than 50%.

A foaming magnification of the resin is 1.1 to 100.

In the universal joint of the present invention with the above-described lubrication system, a rotational torque is transmitted owing to engagement between track grooves provided on an outer member and an inner member and a torque transmission member; the torque transmission member rolls along the track groove to move in an axial direction; the grease for auxiliary lubrication and the foamed lubricant are present together inside the universal joint; and the grease for auxiliary lubrication satisfies the condition that (1) the penetration thereof is not less than 175 and less than 285 or that (2) the mixing ratio of the thickener to the grease for auxiliary lubrication is not less than 10 wt % and less than 40 wt %.

The grease for auxiliary lubrication is enclosed in at least one portion of the universal joint selected from among a bottom portion of the outer member, a rolling portion, and a sliding portion.

The universal joint is a constant velocity universal joint.

Effect of the Invention

In the lubrication system of the present invention comprising the foamed lubricant containing the lubricating component in the resin thereof which foams, hardens, and becomes porous; and the grease for auxiliary lubrication which is present together with the foamed lubricant in the portion to be lubricated, the grease for auxiliary lubrication satisfies the condition that (1) the penetration thereof is not less than 175 and less than 285 or that (2) the mixing ratio of the thickener to the grease for auxiliary lubrication is not less than 10 wt % and less than 40 wt %. Therefore even though a centrifugal force is applied to the sliding portion of the universal joint or the like, it is difficult for the grease for auxiliary lubrication to flow out of the sliding portion. Further when the lubricating component exudes insufficiently from the foamed lubricant, the grease for auxiliary lubrication is capable of bearing the lubricating function.

Consequently at the sliding portion and the like of the bearing or the universal joint in which the foamed lubricant is enclosed, the lubrication system of the present invention is capable of performing the lubricating function sufficiently and continuously without the shortage of the lubricant.

By setting the penetration of the grease for auxiliary lubrication to not less than 175 and less than 285, the grease easily remains at the sliding portion, thus securely providing the lubricating property for a long time, which facilitates handleability in enclosing the grease for auxiliary lubrication in a portion to be lubricated. When the penetration is less than 175, the grease for auxiliary lubrication is so hard that the grease for auxiliary lubrication is incapable of displaying a sufficient lubricating function, which makes it difficult to enclose it in the portion to be lubricated.

By setting the mixing ratio of the thickener to the grease for auxiliary lubrication to not less than 10 wt % and less than 40 wt %, the grease for auxiliary lubrication has a predetermined degree of viscosity and is easily present at the sliding portion where the thickener serves as a cushioning material between two surfaces, thus preventing metal contact.

In the present invention, the lubricating component is held inside the resin. Thus owing to the flexibility of the resin, for example, owing to deformation caused by an external force such as compression, expansion, flexure, and twist, the lubricating component can be exuded from the resin and gradually discharged to the outside from gaps between molecules of the resin. At this time, the exudation amount of the lubricating component can be minimized by selecting the kind of the resin component so as to change the extent of the elastic deformation which occurs in dependence on the intensity of the external force.

In the lubrication system of the present invention, the resin has a large surface area due to foaming. Thus an excess of the lubricating component exuded can be temporarily held inside pores again. Thus the exudation amount of the lubricating component is stable. Further by holding the lubricating component inside the resin and impregnating the lubricating component into the pores, the lubricant is held in a larger amount in this state than in an unfoamed state.

In addition, the foamed lubricant used in the present invention requires a much smaller energy than an unporous material when it is bent and is capable of flexibly deforming with the foamed lubricant holding the lubricating component therein at a high density. Further because the foamed lubricant has a lot of porous portions, the foamed lubricant is advantageous in that the universal joint can be made lightweight.

In the universal joint of the present invention with the above-described lubrication system, the rotational torque is transmitted owing to engagement between the track grooves provided on the outer member and the inner member and the torque transmission member; the torque transmission member rolls along the track groove, thus moving in the axial direction; and the grease for auxiliary lubrication and the foamed lubricant are present together inside the universal joint. Therefore at the sliding portion and other portions of the joint in which the foamed lubricant is enclosed, the lubrication system is capable of performing a lubricating function sufficiently and continuously without the shortage of the lubricant.

By enclosing the foamed lubricant inside the universal joint, the lubricant is allowed to be present in the vicinity of the sliding portion thereof. Therefore the lubricant can be supplied to the sliding portions more easily than lubrication performed by using only the grease or the lubricating oil. In addition, because the foamed lubricant has a lot of porous portions, it is possible to make the universal joint light weight.

EXPLANATION OF REFERENCE NUMERALS AND SYMBOLS

Figure 1:
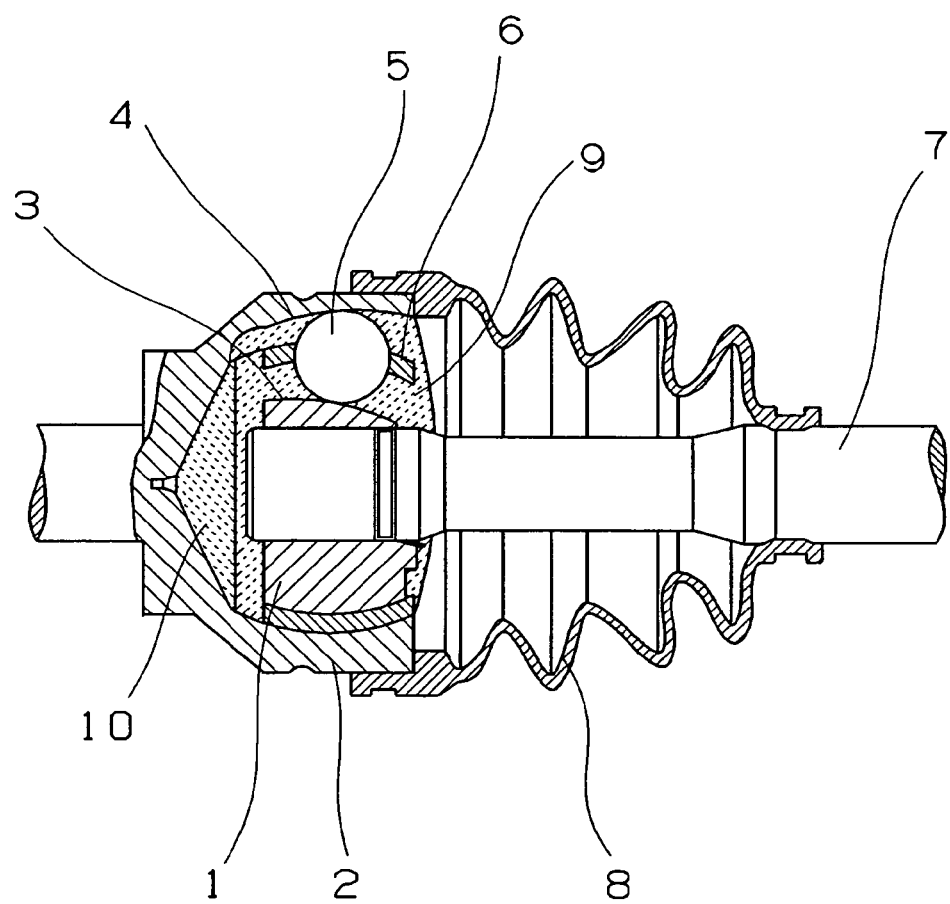
FIG. 1 is a sectional view showing a constant velocity universal joint with a lubrication system of the present invention.

1: inner member
2: outer member
3: inner member-side track groove
4: outer member-side track groove
5: steel ball (torque transmission member)
6: cage
7: shaft
8: boot
9: foamed lubricant
10: grease for auxiliary lubrication

BEST MODE FOR CARRYING OUT THE INVENTION

Figure 2:
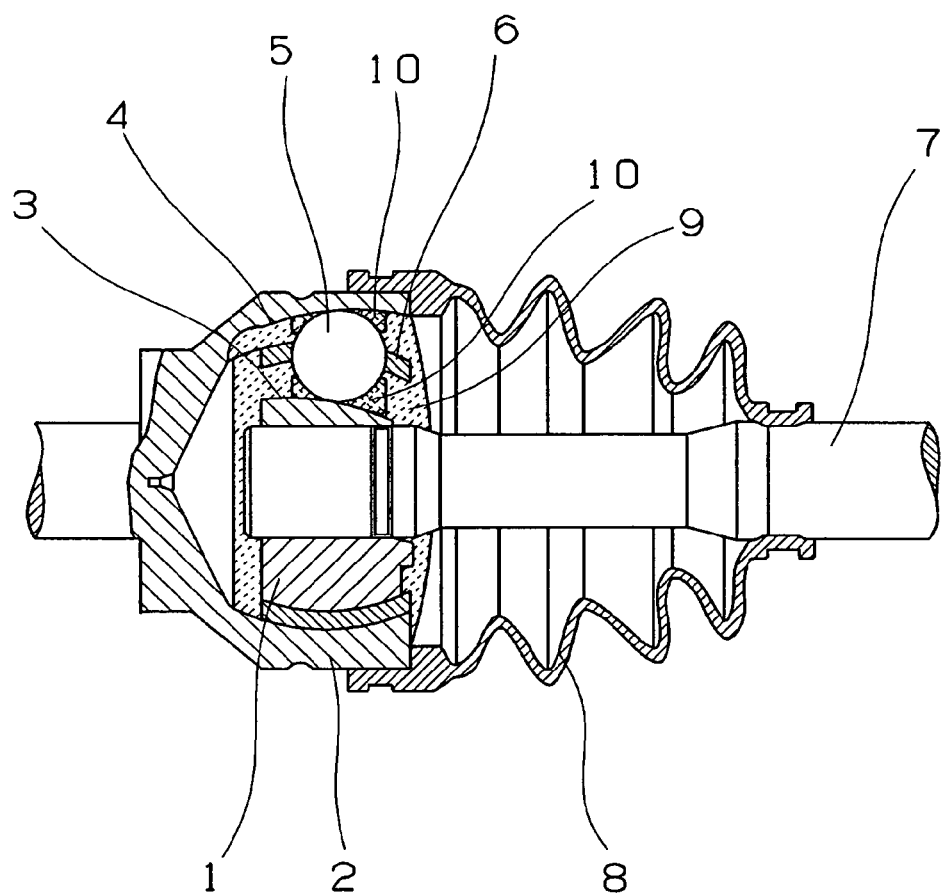
FIG. 2 is a sectional view showing another constant velocity universal joint with the lubrication system of the present invention.
Figure 3:
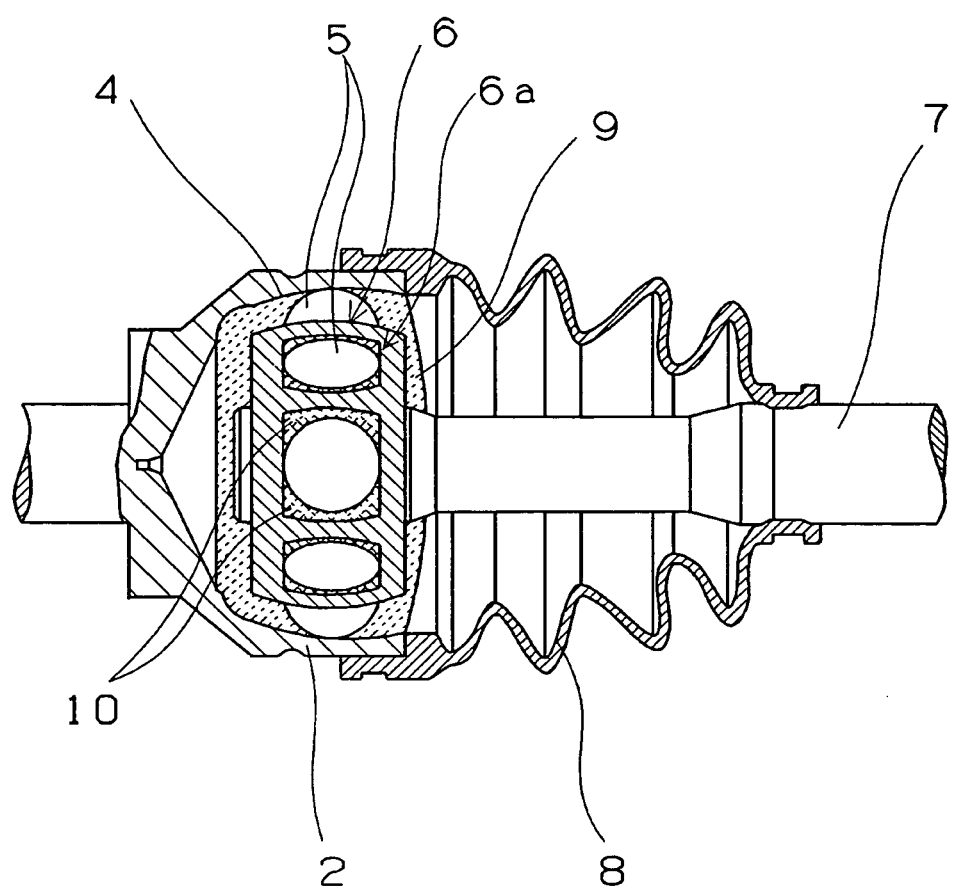
FIG. 3 is a sectional view showing still another constant velocity universal joint with the lubrication system of the present invention.

A case in which the lubrication system of the present invention is applied to a constant velocity universal joint is exemplified to concretely describe the action of a foamed lubricant and that of a grease for auxiliary lubrication. FIGS. 1 through 3 show an embodiment in which the present invention is applied to a ball-fixed type constant velocity universal joint which is one of fixed type constant velocity universal joints.

FIG. 1 is a sectional view showing a constant velocity universal joint using the lubrication system of the present invention. As shown in FIG. 1, the constant velocity universal joint is constructed of an inner member 1, an outer member 2, an inner member-side track groove 3, an outer member-side track groove 4, a steel ball 5 serving as a torque transmission member, a cage 6, a shaft 7, a boot 8, a foamed lubricant 9, grease 10 for auxiliary lubrication, and accessories. At this time, in the constant velocity universal joint, the grease 10 for auxiliary lubrication is accommodated at a bottom portion of the outer member 2, whereas the foamed lubricant 9 is present together with the grease 10 for auxiliary lubrication in the vicinity of the steel ball 5 serving as the torque transmission member.

FIG. 2 is a sectional view showing another constant velocity universal joint using the lubrication system of the present invention. As shown in FIG. 2, the constant velocity universal joint is constructed of the inner member 1, the outer member 2, the inner member-side track groove 3, the outer member-side track groove 4, the steel balls 5, the cage 6, the shaft 7, the boot 8, the foamed lubricant 9, the grease 10 for auxiliary lubrication, and accessories. At this time, the grease 10 for auxiliary lubrication is disposed in a track portion in the vicinity of the steel ball 5, whereas the foamed lubricant 9 is present together with the grease 10 for auxiliary lubrication inside a space surrounded in a rotational direction with the outer member-side track groove 4 on which the steel ball 5 slides.

FIG. 3 is a sectional view showing another constant velocity universal joint using the lubrication system of the present invention. As shown in FIG. 3, the constant velocity universal joint is constructed of the inner member (not shown), the outer member 2, the inner member-side track groove (not shown), the outer member-side track groove 4, the steel balls 5, the cage 6 having a plurality of cage windows 6a, the shaft 7, the boot 8, the foamed lubricant 9, the grease 10 for auxiliary lubrication, and accessories. At this time, the grease 10 for auxiliary lubrication is accommodated at the cage window 6a in the vicinity of the steel ball 5, whereas the foamed lubricant is present together with the grease 10 for auxiliary lubrication inside the space surrounded in the rotational direction with the outer member-side track groove 4 on which the steel ball 5 slides.

The foamed lubricant 9 contains a lubricating component in resin thereof which has foamed, hardened, and become porous. The foamed lubricant 9 gradually exudes the lubricating component from the foamed lubricant to sliding portions including the inner member-side track groove 3, the outer member-side track groove 4 and the torque transmission member including the surface of the steel ball 5, the surface of the cage 6, and the like owing to a centrifugal force generated by a rotational motion of the constant velocity universal joint, external stresses such as compression, flexure, and expansion which occur when the constant velocity universal joint takes a large operation angle or a capillary phenomenon.

The grease 10 for auxiliary lubrication disposed at the track portion in the vicinity of the steel ball 5, at the cage window 6a in the vicinity of the steel ball 5 or at the bottom portion of the outer member 2 is not contained in the resin unlike the lubricating component contained in the foamed lubricant. Therefore when the lubricating component contained in the foamed lubricant does not exude or when the exudation amount is short, the grease 10 for auxiliary lubrication is capable of contributing to the lubrication of the sliding portion of the constant velocity universal joint and the rolling portion thereof.

The amount of the grease 10 for auxiliary lubrication to be enclosed inside the universal joint is favorably 1 to 60 vol % and more favorably 3 to 40 vol % of the volume of the space inside the universal joint. If the amount of the grease 10 for auxiliary lubrication is too small, the amount thereof is insufficient for utilizing it for auxiliary lubrication. If the amount of the grease 10 for auxiliary lubrication is too large, the enclosing amount of the foamed lubricant which is intended to contribute to lubrication for a long time is small. Thus there occurs a problem in the durability.

Although the place where the grease 10 for auxiliary lubrication is enclosed or applied is not specifically limited, it is preferable to enclose or apply the grease 10 for auxiliary lubrication in the vicinity of the bottom portion of the outer member, the rolling portion or the sliding portion inside the universal joint. As concrete portions of the rolling portion, the portion of the track portion in the vicinity of the steel ball is exemplified. As concrete portions of the sliding portion, it is possible to list the inside-diameter and outside-diameter surfaces of the cage, the inside of the cage window, the spherical surfaces of the outer member—the cage—the inner member (see FIGS. 1 through 3). The grease 10 for auxiliary lubrication directly contributes to lubrication when it is enclosed in the above-described portions. Even when the grease 10 for auxiliary lubrication is enclosed at the bottom portion of the outer member, the grease 10 for auxiliary lubrication is gradually supplied to the vicinity of the sliding portion and the rolling portion inside the joint owing to a centrifugal force and a bending motion.

The method of enclosing the grease 10 for auxiliary lubrication inside the universal joint is not specifically limited. Before filling the foamed lubricant inside the universal joint, the grease for auxiliary lubrication may be enclosed in or applied to the inside of the universal joint and component parts thereof. Alternatively after the foamed lubricant is filled in the universal joint, the grease for auxiliary lubrication may be injected into a desired portion by an injector (or appliance similar thereto).

As examples in which the universal joint of the present invention is utilized as the constant velocity universal joint, in addition to the above-described ball-fixed type joint (hereinafter referred to as BJ), an undercut free joint (hereinafter referred to as UJ) and the like are exemplified. There is a case in which the number of balls of the BJ and UJ is six or eight.

When the foamed lubricant is enclosed in the Bj or the UJ, the lubricant is filled in only portions required to be lubricated. Therefore the lubricant is capable of contributing to the production of a low cost and lightweight universal joint. Further because an operational angle is large, the foamed lubricant is easily subjected to compression and flexure. Thereby the lubricant can be easily supplied to the rolling portion and the sliding portion.

As examples in which the universal joint of the present invention is utilized as the sliding-type constant velocity universal joint, a double offset joint, a tripod joint, and a crossgroove joint are listed.

As a non-constant velocity universal joint, a cross joint is exemplified.

The foamed lubricant of the present invention is described in detail below.

The foamed lubricant "exudes the lubricating component gradually therefrom to the outside owing to external stresses such as centrifugal force, compression, flexure, and expansion". Therefore there is a case in which the lubricating component is insufficiently exuded from the foamed lubricant or when the lubricating component runs dry, the lubricating component is insufficiently present at the sliding portion. In the present invention, by using the grease for auxiliary lubrication together with the foamed lubricant, it is possible to compensate the shortage of the lubricating component which exudes from the foamed lubricant. Because the penetration of the grease for auxiliary lubrication is less than 285 or the mixing ratio of a thickener to the grease is not less than 10 wt % and less than 40 wt %, the grease for auxiliary lubrication has a predetermined degree of viscosity and is easily present at the sliding portion where the grease for auxiliary lubrication prevents metal contact, thus serving as a cushioning material and securely providing the lubricating property for a long time.

In the foamed lubricant of the present invention, owing to the flexibility of the resin, for example, owing to deformation caused by an external force such as compression, expansion, flexure, and twist, the lubricating component can be exuded from the resin and gradually discharged to the outside from gaps between molecules of the resin. At this time, the exudation amount of the lubricating component can be minimized by selecting the resin to change the extent of the elastic deformation which occurs in dependence on the intensity of the external force.

The resin contained in the foamed lubricant used in the present invention has a large surface area due to foaming. Thus the lubricating oil, serving as the lubricating component, which has exuded in an excess amount can be temporarily held in bubbles of a foam again. Thus the exudation amount of the lubricating oil is stable. Further by holding the lubricating oil inside the resin and impregnating the lubricating oil into the bubbles of the foam, the lubricating oil is held in a larger amount in this state than in an unfoamed state.

In addition, the foamed lubricant used in the present invention requires a much smaller energy than a non-foam when it is bent and is capable of flexibly deforming with the foamed lubricant holding the lubricating component such as the lubricating oil therein at a high density. Therefore even though the foamed lubricant shrinks and surrounds the torque transmission member and the rolling element in the process of cooling the foamed lubricant after it is solidified, the foamed lubricant requires a small energy when it bends and deforms. Therefore the foamed lubricant is capable of easily deforming, thus preventing the occurrence of the problem that the rotational torque becomes large. In addition, because the foamed lubricant has a lot of foamed portions, namely, porous portions, the foamed lubricant is advantageous in that the universal joint can be made lightweight.

Because the foamed lubricant used in the present invention is formed by merely foaming and hardening the mixture containing the lubricating component and the resin, it is unnecessary to prepare a special equipment and possible to mold the mixture by filling it in a desired place.

By controlling the mixing amount of the components of the mixture, the density of the foamed lubricant can be changed.

In the present invention, it is preferable that the resin, composing the foamed lubricant, which foams, hardens, and becomes porous has rubber-like elasticity after it foams and hardens and has the property of exuding the lubricating component owing to deformation thereof.

The resin may be foamed and hardened when it is generated or when a mixture of the resin and a foaming agent added thereto is molded. The "hardening" means a crosslinking reaction and/or a phenomenon in which a liquid material solidifies. The "rubber-like elasticity" means rubber elasticity and also restoration to an original configuration of resin owing to the elimination of an applied external force therefrom.

As the resin which foams, hardens, and becomes porous, rubber and plastics are exemplified.

As the rubber, it is possible to list various rubbers such as natural rubber, isoprene rubber, butadiene rubber, styrene butadiene rubber, chloroprene rubber, butyl rubber, nitrile rubber, ethylene propylene rubber, silicone rubber, urethane elastomer, fluororubber, and chlorosulfone rubber.

As the plastic, it is possible to list general-purpose plastics and engineering plastics such as polyurethane resin, polyethylene resin, polypropylene resin, polystyrene resin, polyvinyl chloride resin, polyacetal resin, polyamide 4, 6 resin (PA4, 6), polyamide 6, 6 resin (PA6, 6), polyamide 6T resin (PA6T), and polyamide 9T resin (PA9T).

Of the above-described resins, polyurethane resin that easily foams, hardens, and becomes porous is preferable.

The polyurethane resin that can be used in the present invention is a foamed and hardened polymer formed by a reaction between isocyanate and polyol. It is preferable to use a foamed and hardened urethane prepolymer having an isocyanate group (—NCO) in its molecules. The isocyanate group may be blocked with other substituting groups. The isocyanate group contained in the molecules may be disposed at the termination of its molecular chain or contained at the termination of its side chain branched from the molecular chain. The urethane prepolymer may have a urethane bond in the molecular chain. A hardener for the urethane prepolymer may be polyol or polyamine.

The urethane prepolymer can be obtained by a reaction between a compound having an active hydrogen group and polyisocyanate.

As compounds having the active hydrogen group, low molecular weight polyol, polyether-based polyol, polyester-based polyol, and castor oil-based polyol are listed. These compounds can be used singly or as mixtures each consisting of not less than two kinds thereof. As the low molecular weight polyol, it is possible to list bivalent low molecular weight polyols, for example, ethylene glycol, diethylene glycol, propylene glycol, 1,4-butanediol, 1,6-hexanediol, neopentyl glycol, and hydrogenated bisphenol A are listed; and trivalent or higher low molecular weight polyols (trivalent through octavalent low molecular weight polyols), for example, glycerin, trimethylolpropane, hexanetriol, pentaerythritol, sorbitol, and sucrose.

As the polyether-based polyols, an addition product of the low molecular weight polyol with an alkylene oxide (alkylene oxide having two to four carbon atoms, for example, ethylene oxide, propylene oxide, and butylene oxide) and polymers obtained by ring opening polymerization of the alkylene oxide are listed. More specifically, polyethylene glycol, polypropylene glycol, polytetramethylene ether glycol are listed.

As the polyester-based polyol, polyester polyol, polycaprolacton polyol, and polyether ester polyol are listed. The polyester polyol is obtained by condensation polymerization of carboxylic acid (aliphatic saturated or unsaturated carboxylic acid, for example, adipic acid, azelaic acid, dodecanoic acid, maleic acid, fumaric acid, itaconic acid, dimerized linolic acid and/or aromatic carboxylic acid, for example, phthalic acid, isophthalic acid) and polyol (above-described low-molecular weight polyol and/or polyether polyol).

The polycaprolacton polyol is obtained by addition polymerization of ε-caprolacton, α-methyl-ε-caprolacton, ε-methyl-ε-caprolacton or the like with a polymerization initiator of glycols or triols under the presence of a catalyst such as an organometallic compound, a metal chelate compound, a fatty metal acyl compound or the like. The polyether ester polyol is obtained by an addition reaction between polyester having a carboxyl group and/or an OH group at its terminal and the alkylene oxide, for example, ethylene oxide, propylene oxide or the like. As the castor oil-based polyol, it is possible to list castor oil; esters formed by ester interchange between the castor oil or castor oil fatty acid and the low-molecular polyol, the polyether polyol or the polyester polyol; and esterified polyol.

As the polyisocyanate, aromatic di-isocyanate, aliphatic di-isocyanate or alicyclic di-isocyanate, and polyisocyanate compounds are listed.

As the aromatic di-isocyanate, diphenylmethane di-isocyanate, 2,4-tolylene di-isocyanate, 2,6-tolylene di-isocyanate, and mixtures thereof, 1,5-naphthylene di-isocyanate, 1,3-phenylene di-isocyanate, and 1,4-phenylene di-isocyanate are listed.

As the aliphatic or the alicyclic di-isocyanate, 1,6-hexamethylene di-isocyanate, 1,12-dodecane di-isocyanate, 1,3-cyclobutane di-isocyanate, 1,3-cyclohexane di-isocyanate, 1,4-cyclohexane di-isocyanate, isopropane di-isocyanate, 2,4-hexahydrotoluylenedi-isocyanate, 2,6-hexahydrotoluylene di-isocyanate, 1,3-hexahydrophenyl di-isocyanate, 1,4-hexahydrophenyl di-isocyanate, 2,4'-perhydrodiphenylmethane di-isocyanate, and 4,4'-perhydrodiphenylmethane di-isocyanate are listed.

As the polyisocyanate compound, 4,4',4''-triphenylmethane tri-isocyanate, 4,6,4'-diphenyltri-isocyanate, 2,4,4'-diphenylether tri-isocyanate, and polymethylenepolyphenyl polyisocyanate are listed.

In addition, those formed by modifying part of each of these isocyanates to biuret, allophanate, carbodiimide, oxazolidone, amide, imide or the like are listed.

As the urethane prepolymer preferable in the present invention, prepolymers, known as a casting urethane prepolymer, which are obtained by addition polymerization of polylactone ester polyol or polyether polyol with the polyisocyanate are exemplified.

It is preferable to use the urethane prepolymer obtained by addition polymerization of the polylactone ester polyol obtained by a ring opening reaction of caprolacton with the polyisocyanate under the presence of short-chain polyol.

As the polyether polyol, addition products of the alkylene oxide and polymers obtained by ring opening polymerization of the alkylene oxide are listed. Urethane prepolymers obtained by the addition polymerization of polyisocyanate with these addition products or polymers are preferable.

Exemplifying commercially available products of the urethane prepolymer that can be preferably used in the present invention, a product having a commercial name of Placcel EP produced by Daicel Chemical Industries, Ltd. is preferable. The Placcel EP is a white solid urethane prepolymer having a melting point not less than a room temperature. Exemplifying the polyether polyol, a product having a commercial name of Preminol produced by Asahi Glass Co., Ltd. is preferable. The Preminol has a molecular weight of 5000 to 12000.

As hardeners for hardening the urethane prepolymer, it is possible to use aromatic polyamines represented by 3,3'-dichloro-4,4'-diaminodiphenylmethane (hereinafter referred to as MOCA), 4,4'-diamino-3,3'-diethyl-5,5'-dimethyldiphenylmethane, trimethylene-bis-(4-aminobenzoate), bis(methylthio)-2,4-toluenediamine, bis(methylthio)-2,6-toluenediamine, methylthiotoluenediamine, 3,5-diethyltoluene-2,4-diamine, and 3,5-diethyltoluene-2,6-diamine; low molecular weight polyols represented by the above-described polyisocyanate, 1,4-butane glycol, and trimethylolpropane; polyether polyol; castor oil-based polyol; polyester-based polyol; terminal hydroxyl group liquid polybutadiene; terminal hydroxyl group liquid polyisoprene; terminal hydroxyl group liquid polyolefin-based polyol; and liquid rubber having not less than two hydroxyl groups represented by compounds which are obtained by modifying the terminal hydroxyl group of the above-described compounds with an isocyanate group or an epoxy group. These compounds can be used singly or in combination. Of these compounds, the aromatic polyamine is preferable for hardening the urethane prepolymer obtained by addition polymerization of the polylactone ester polyol with the polyisocyanate, because the aromatic polyamine has both foaming property and rubber-like elasticity, is industrially easily available, and is superior to other hardeners in terms of the cost and property.

As means for foaming the resin to obtain the foamed lubricant, known foaming means can be adopted. For example, it is possible to list a chemical foaming method of generating a volatile gas by a chemical reaction, a physical method of heating and vaporizing water and an organic solvent such as acetone, hexane, and the like having a comparatively low boiling point; a mechanical foaming method of blowing an inactive gas such as nitrogen or air into the resin from outside; and a method of using a dissolving-type foaming agent that chemically dissolves due to heating treatment or optical irradiation and generates a nitrogen gas or the like, for example, azobisisobutyronitrile (AIBN), azodicarbonamide (ADCA), and the like.

The urethane prepolymer used in the present invention has an isocyanate group (—NCO) in its molecule. Thus it is preferable to use a chemical foaming method in which water is used as a foaming agent to generate carbon dioxide by a chemical reaction between the isocyanate group and water molecules. This method is preferable because the method easily generates open cells.

When the chemical foaming method accompanied by the above-described reaction is used, it is preferable to use a catalyst as necessary. For example, a tertiary amine catalyst and an organometallic catalyst are used. As the tertiary amine catalyst, monoamines, diamines, triamines, cyclic amines, alcohol amines, ether amines, derivatives of imidazole, and an acid block amine catalyst are listed.

As the organometallic catalyst, stannous octoate, dibutyltin diacetate, dibutyltin dilaurate, dibutyltin mercaptide, dibutyltin thiocarboxylate, dibutyltin maleate, dioctyltin dimercaptide, dioctyltin thiocarboxylate, and octenoate are listed. A plurality of these catalysts may be used as a mixture to adjust a balance in the reaction.

In addition to the above-described resin, it is possible to use various adhesive agents such as a urethane-based adhesive agent, a cyanoacrylate-based adhesive agent, an epoxy-based adhesive agent, a polyvinyl acetate-based adhesive agent, and a polyimide-based adhesive agent by foaming and hardening these adhesive agents.

In the present invention, various additives may be added to the resin which foams, hardens, and becomes porous as necessary. As the additives, an antioxidant represented by hindered phenol-based antioxidant, a reinforcing agent (carbon black, white carbon, colloidal silica, and the like), an inorganic filler (calcium carbonate, barium sulfate, talc, clay, silica powder, and the like), an age resistor, a fire retardant, a metal-inactivating agent, antistatic agent, a fungal-resistant agent, a filler, and a coloring agent are exemplified.

It is possible to use any lubricating component composing the foamed lubricant together with the resin which foams, hardens, and becomes porous, provided that the lubricating component does not dissolve therein a solid component forming the foam. As the lubricating component, it is possible to use lubricating oil, grease, wax, and the like singly or in combination of not less than two kinds thereof.

As the lubricating oil, mineral oil such as paraffin oil and naphthene oil, ester-based synthetic oil, ether-based synthetic oil, hydrocarbon-based synthetic oil, GTL base oil, fluorine oil, and silicone oil are listed. These lubricating oils can be used singly or as mixed oils.

In the case where the resin which foams, hardens, and becomes porous and the lubricating oil do not dissolve or disperse in each other owing to a chemical incompatibility such as polarity, by using lubricating oil whose viscosity is close to that of the resin, they can be physically easily mixed with each other. Thereby it is possible to prevent the segregation of the lubricating oil.

The grease is formed by adding a thickener to base oil. As the base oil, the above-described lubricating oils can be listed. As the thickener, soaps such as lithium soap, lithium complex soap, calcium soap, calcium complex soap, aluminum soap, and aluminum complex soap; and urea-based compounds such as diurea compounds, polyurea compounds, and the like are listed. But the thickener is not limited to the above-described soaps and urea-based compounds.

The diurea compound can be obtained by a reaction between di-isocyanate and monoamine. As the di-isocyanate, phenylene di-isocyanate, diphenyl di-isocyanate, phenyl di-isocyanate, diphenylmethane di-isocyanate, octadecane di-isocyanate, decane di-isocyanate, and hexane di-isocyanate are listed.

As the monoamine, octylamine, dodecylamine, hexadecylamine, octadecylamine, oleylamine, aniline, p-toluidine, and cyclohexylamine are listed.

The polyurea compound is obtained by a reaction between the di-isocyanate and the monoamine as well as diamine. The di-isocyanate and the monoamine similar to those used to form the diurea compound are listed. As the diamine, ethylenediamine, propanediamine, butanediamine, hexanediamine, octanediamine, phenylenediamine, tolylenediamine, and xylenediamine are listed.

The mixing ratio of the base oil to the grease, namely, the mixing ratio of the base oil to the entire grease component is 1 to 98 wt % and preferably 5 to 95 wt %. If the mixing ratio of the base oil to the entire grease component is less than 1 wt %, it is difficult to sufficiently supply the lubricating oil to a necessary portion. If the mixing ratio of the base oil to the entire grease component is more than 98 wt %, the grease does not solidify even at a low temperature, but remains liquid.

As wax, it is possible to list hydrocarbon-based synthetic wax, polyethylene wax, fatty ester-based wax, fatty amide-based wax, ketone amines, and hydrogen hardened oil. Oil may be mixed with these waxes. As oil components that can be used, those similar to the above-described lubricating oils can be used.

The above-described lubricating components may contain various additives including a solid lubricant such as molybdenum disulfide, graphite; a friction modifier such as organic molybdenum; an oily agent such as amine, fatty acid, fats and oils; an antioxidant such as amine-based compounds and phenol-based compounds; a rust inhibiter such as petroleum sulfonate, dinonylnaphthalene sulfonate, and sorbitan ester; sulfur-based and sulfur-phosphor-based extreme pressure agents; anti-wear agents such as organic zinc and phosphor-based compounds, metal deactivator such as benzotriazole, sodium nitrite; and a viscosity index improver such as polymethacrylate, polystyrene.

The foamed lubricant for use in the present invention is obtained by foaming and hardening the mixture containing the lubricating component, the resin, the hardener, and the foaming agent.

The mixing ratio of the lubricating component to the entire mixture is 1 to 90 wt % and preferably 5 to 80 wt %. If the mixing ratio of the lubricating component to the entire mixture is less than one wt %, the supply amount of the lubricating component is small and thus the foamed lubricant is incapable of displaying its function. If the mixing ratio of the lubricating component to the entire mixture is more than 90 wt %, the mixture does not solidify.

The mixing ratio of the resin to the entire mixture is 8 to 98 wt % and preferably 20 to 80 wt %. If the mixing ratio of the resin to the entire mixture is less than 8 wt %, the mixture does not solidify. If the mixing ratio of the resin to the entire mixture is more than 98 wt %, the supply amount of the lubricating component is small and thus the foamed lubricant is incapable of displaying its function.

The mixing ratio of the hardener is determined by the mixing amount of the resin and a foaming magnification. The mixing ratio of the foaming agent is determined in terms of the foaming magnification which will be described later.

The method of mixing the components in producing the foamed lubricant is not limited to a specific method, but the components can be mixed with one another by using a stirring machine ordinarily used. For example, a Henschel mixer, a ribbon mixer, a juicer mixer or a mixing head is used.

It is preferable to uniformly disperse molecules of each component of the mixture by using a surface active agent such as a commercially available silicone-based foam stabilizer. In dependence on the kind of the foam stabilizer, it is possible to control the surface tension so as to adjust the kind of generated bubbles to open cells or closed cells. As the surface active agent, an anionic surface active agent, a nonionic surface active agent, a cationic surface active agent, an amphoteric surface active agent, a silicon surface active agent, and a fluorine-based surface active agent are listed.

The foamed lubricant that is used in the present invention contains the lubricating component in the resin which foams, hardens, and becomes porous and is capable of supplying the lubricating component such as the lubricating oil to the outside by the external force such as compression, flexure, a centrifugal force, expansion of bubbles caused by a rise of temperature, and the like.

In the foamed lubricant that is used in the present invention, it is desirable to adopt a reaction-type impregnation method of simultaneously making foaming and hardening reactions of the resin in the presence of the lubricating component. Thereby it is possible to fill the lubricating component in the resin to a high extent and omit to carry out a later impregnation step of replenishing the resin with the lubricant by impregnating the lubricant thereinto.

On the other hand, in the later impregnation method of molding a foamed solid matter in advance and impregnating the foamed solid matter with the lubricating component, a sufficient amount of the liquid lubricating component does not permeate into the resin. Thus this method does not have a sufficient performance of retaining the lubricating component, and the lubricating component is discharged in a short period of time. Therefore when the foamed lubrication formed by using the later impregnation method is used for a long time, there is a case where the supply of the lubricating component is short. Therefore it is preferable to adopt the later impregnation method as an auxiliary means of the reaction type impregnation method.

It is preferable that bubbles generated when the resin becomes porous at the time of foaming and hardening are open cells communicating with each other so that the lubricating component is directly supplied to the outside from the surface of the resin through the open cells by an external stress. In the case of closed bubbles not communicating with one another, the whole amount of the lubricating oil contained in the solid component is temporarily kept in isolation in the closed cells. Thereby it is difficult for the lubricating component to move between bubbles. Thus there is a case in which a sufficient amount of the lubricating oil is not supplied to the periphery of the torque transmission member and the sliding portion.

In the present invention, the open cell ratio of the foamed lubricant is favorably not less than 50% and more favorably not less than 70%. If the open cell ratio is less than 50%, the lubricating oil in the resin that has foamed and hardened and become porous is temporarily captured in the closed cells at a high rate. Thus there is a case in which the lubricating oil is not supplied to the outside when necessary.

The open cell ratio of the foamed lubricant that is used in the present invention can be computed in a procedure described below.

(1) The foamed lubricant that has foamed and hardened is cut to an appropriate size to obtain a specimen A. The weight of the specimen A is measured.

(2) The specimen A is cleaned with a Soxhlet apparatus for three hours (solvent: petroleum benzine). Thereafter the specimen A is left in a constant-temperature bath at 80° C. for two hours to dry an organic solvent completely and obtain a specimen B. The weight of the specimen B is measured.

(3) The open cell ratio is computed in a procedure described below.

Open cell ratio=(1−(weight of resin of specimen $B$−weight of resin of specimen $A$)/weight of lubricating component of specimen $A$)×100

The weight of the resin of each of the specimens A, B and that of the lubricating component thereof are computed by multiplying the weight of each of the specimens A, B by a charge ratio of the composition.

Because the lubricating component captured in the closed cells not interconnected with one another is not discharged to the outside in the Soxhlet cleaning for three hours, the weight of the specimen B is not decreased. Therefore in the above-described operation, the open cell ratio can be computed by considering that the decrease amount of the weight of the example B is caused by the discharge of the lubricating component from the open cells.

It is favorable to set the foaming magnification of the foamed lubricant that is used in the present invention to 1.1 to 100. It is more favorable to set the foaming magnification thereof to 1.1 to 10. If the foaming magnification of the foamed lubricant is less than 1.1, the volume of a bubble is small. Thus it is impossible for the foamed lubricant to allow deformation when an external stress is applied thereto. Further because the solid matter which has become porous is so hard that it is incapable of deforming in conformity to the external stress. On the other hand, if the foaming magnification of the foamed lubricant is more than 100, it is difficult for the foamed lubricant to have a strength to such an extent that the foamed lubricant withstands the external stress, and thus damage or destruction may occur.

The foamed lubricant may be foamed and hardened after the mixture containing the lubricating component and the resin is poured into the member to be lubricated. Alternatively after the mixture is foamed and hardened at a normal pressure, the mixture is later-processed into a desired configuration by means of cutting or grinding. Thereafter the foamed lubricant may be incorporated inside the member to be lubricated.

In the present invention, it is preferable to adopt a method of pouring the mixture into the member to be lubricated before foaming and hardening the mixture and thereafter foaming and hardening the mixture inside the member to be lubricated, because this method allows the foamed lubricant to be easily filled in a desired portion inside a member to be lubricated such as the constant velocity universal joint having a complicated configuration and eliminates the need for preparing a molding die for obtaining a foamed molding and performing a grinding process. By adopting this method, it is possible to facilitate production steps and decrease the cost.

In the lubrication system of the present invention and the universal joint with the lubrication system, the property and the like of the grease for auxiliary lubrication that can be present together with the foamed lubricant in the portion to be lubricated are described in detail below.

In the lubrication system of the present invention, as the grease for auxiliary lubrication that can be present together with the foamed lubricant in the portion to be lubricated, it is possible to use grease which satisfies the condition that (1) the 60-time worked penetration measured in accordance with JIS K 2220 5.3 is not less than 175 and less than 285 or the condition that (2) the mixing ratio of the thickener to the entire grease for auxiliary lubrication is not less than 10 wt % and less than 40 wt %. It is necessary for the grease for auxiliary lubrication to satisfy the penetration or the mixing ratio of the thickener or both.

When the penetration is not less than 285, it is easy for the grease to move owing to flow caused by a centrifugal force or a bending motion and thus the grease easily flows out of the universal joint (toward boot). Therefore there is a case in which the lubricating property cannot be secured for a long time. When the penetration is less than 175, the grease for auxiliary lubrication is so hard that the grease for auxiliary lubrication is incapable of displaying a sufficient lubricating function and handled with difficulty in enclosing it in the portion to be lubricated.

When the mixing ratio of the thickener is less than 10 wt %, the grease easily flows out of the sliding portion and further it is difficult to obtain the effect that the grease for auxiliary lubrication is present on a sliding surface, prevents metal contact, and serves as a cushioning material. When the mixing ratio of the thickener is not less than 40 wt %, the grease for auxiliary lubrication is so hard that operability is low.

As an example of the grease for auxiliary lubrication, grease that can be used as the lubricating component of the foamed lubricant is exemplified. As the thickener and base oil of the grease for auxiliary lubrication, it is possible to use those exemplified as an example of the lubricating component of the foamed lubricant. Similarly the grease for auxiliary lubrication is capable of containing various additives.

In the lubrication system of the present invention, the amount of the grease for auxiliary lubrication which can be present together with the foamed lubricant is favorably 1 to 60 vol % and more favorably 3 to 40 vol % of the volume of the space of the object to be lubricated. If the amount of the grease for auxiliary lubrication is less than one vol %, the amount thereof is insufficient for utilizing it as auxiliary lubrication. If the amount of the grease for auxiliary lubrication is more than 60 vol %, the filling amount of the foamed lubricant which contributes to lubrication for a long time is small. Thus there occurs a problem in the durability.

In the present invention, the method of enclosing the grease for auxiliary lubrication inside the portion to be lubricated of the universal joint or the like or applying the grease for auxiliary lubrication thereto is not specifically limited. Before filling the foamed lubricant inside the portion to be lubricated, the grease for auxiliary lubrication may be applied to the portion to be lubricated and component parts thereof. Alternatively after the foamed lubricant is filled inside the portion to be lubricated, the grease for auxiliary lubrication may be injected into a desired place by an injector (or appliance similar thereto)

In the lubrication system, the place where the grease for auxiliary lubrication is enclosed or applied is not specifically limited. But it is preferable to enclose or apply the grease for auxiliary lubrication in the vicinity of the sliding portion to be lubricated.

EXAMPLES

<Preparation of Grease for Auxiliary Lubrication>

A grease A for auxiliary lubrication through a grease D for auxiliary lubrication used in examples and comparative examples described below were prepared by using methods described below. The penetration means a 60-time worked penetration measured in accordance with JIS K 2220 5.3.

[Grease A for Auxiliary Lubrication]

12.39 g of diphenylmethane-4,4-di-isocyanate and 10.61 g of p-toluidine were allowed to react with each other in 77 g of mineral oil ("turbine 100" produced by Nippon Oil Corporation). A formed diurea compound was uniformly dispersed to obtain the grease A for auxiliary lubrication. The amount of a thickener contained in the grease was 23 wt %. The measured penetration was 270.

[Grease B for Auxiliary Lubrication]

3.64 g of the diphenylmethane-4,4-di-isocyanate, 3.92 g of stearylamine, and 1.44 g of cyclohexylamine were allowed to react with each other in 91 g of the mineral oil ("turbine 100" produced by Nippon Oil Corporation). The formed diurea compound was uniformly dispersed to obtain the grease B for auxiliary lubrication. The amount of the thickener contained in the grease was 9 wt %. The measured penetration was 280.

[Grease C for Auxiliary Lubrication]

3.94 g of the diphenylmethane-4,4-di-isocyanate and 4.07 g of octylamine were allowed to react with each other in 92 g of the mineral oil ("turbine 100" produced by Nippon Oil Corporation). The formed diurea compound was uniformly dispersed to obtain the grease C for auxiliary lubrication. The amount of the thickener contained in the grease was 8 wt %. The measured penetration was 320.

[Grease D for Auxiliary Lubrication]

9.16 g of the diphenylmethane-4,4-di-isocyanate and 7.84 g of the p-toluidine were allowed to react with each other in 83 g of the mineral oil ("turbine 100" produced by Nippon Oil Corporation). The formed diurea compound was uniformly dispersed to obtain the grease D for auxiliary lubrication. The amount of the thickener contained in the grease was 17 wt %. The measured penetration was 335.

Examples 1, 2, and 5

Initially 3 g of the grease for auxiliary lubrication shown in table 1 was enclosed in the bottom portion of an outer member 2 of a fixed-type eight-ball joint sub-assembly ("EBJ82" produced by NTN corporation, outer diameter: 72.6 mm), shown in FIG. 1, which was constructed of the outer member 2, the inner member 1, the cage 6, and the steel ball 5 serving as the torque transmission member. Thereafter of the components shown in table 1, the components (a), (d), (e), and (i) were sufficiently mixed with one another at 80° C. After the component (b) which dissolved at 120° C. was added to the mixture of the components, all the components were rapidly mixed with one another. After the components (c) and (h) were supplied to the mixture finally, all the components were stirred. 18.0 g of the mixture of the components was enclosed inside the above-described joint sub-assembly in which the grease for the auxiliary lubrication was enclosed. A foaming reaction started in several seconds. After each foamed lubricant was left for 30 minutes in a constant-temperature bath where temperature was set to 100° C. to harden it, a boot, a shaft, and other members were mounted on the joint sub-assembly to obtain a specimen of each constant velocity universal joint in which the foamed lubricant and the grease for auxiliary lubrication were present together. A durability test described below was conducted on the obtained specimens to measure the life period of time thereof. Based on the above-described method of computing the open cell ratio, the open cell ratio of each foamed lubricant was measured. Table 1 shows the results.

<Durability Test Conducted by Using Constant Velocity Universal Joint>

To evaluate whether a desired improved durability was obtained, the specimen of each constant velocity universal joint was evaluated in the following conditions by using an actual machine. Specimens which exceeded 100° C. in the temperature of the surface of the outer member thereof during the test were regarded as having an abnormal temperature rise. Thus the test was discontinued for the specimens having an abnormal temperature rise. After the test finished, the inside of each specimen was inspected. It was evaluated that the specimens which did not have internal damage such as wear, peeling, and the like were judged acceptable and marked by "○" and that specimens which had damage were judged unacceptable and marked by "×".

Torque: 451 N·m
Angle: six degrees
Number of rotations: 580 rpm
Test period of time: 300 hours Examples 3, 4 and 6

Initially 3 g of the grease for auxiliary lubrication shown in table 1 was enclosed at the bottom portion of the outer member of a fixed-type eight-ball joint sub-assembly ("EBJ82" produced by NTN corporation, outer diameter: 72.6 mm), shown in FIG. 1, which was constructed of the outer member 2, the inner member 1, the cage 6, and the steel ball 5 serving as the torque transmission member. After a silicone-based foam stabilizer, mineral oil, an amine catalyst, and water serving as a foaming agent were added to polyether polyol in the amounts (composition) shown in table 1, the mixture was heated at 90° C. and sufficiently stirred. After isocyanate was added to the mixture, the mixture was sufficiently stirred. Thereafter 16.0 g of the mixture was enclosed inside the above-described joint sub-assembly in which the grease for auxiliary lubrication was enclosed. A foaming reaction started in several seconds. After each foamed lubricant was left for 15 minutes in a constant-temperature bath where temperature was set to 90° C. to harden it, the boot, the shaft, and other members were mounted on the joint sub-assembly to obtain a specimen of each constant velocity universal joint in which the foamed lubricant and the grease for auxiliary lubrication were present together. The same items as those measured in the example 1 were measured on the obtained specimens. Table 1 shows the results.

Comparative Example 1

In the composition shown in table 1, a constant velocity universal joint specimen was prepared in a procedure similar to that of the example 2. But the grease for auxiliary lubrication was not enclosed in the specimen. The same items as those measured in the example 1 were measured on the obtained specimen. Table 1 shows the results.

Comparative Example 2

In the composition shown in table 1, a constant velocity universal joint specimen was prepared in a procedure similar to that of the example 3. But the grease for auxiliary lubrication was not enclosed in the specimen. The same items as those measured in the example 1 were measured on the obtained specimen. Table 1 shows the results.

Comparative Example 3

In the composition shown in table 1, a constant velocity universal joint specimen was prepared in a procedure similar to that of the example 2. The grease C for auxiliary lubrication containing 8 wt % of a thickener and having a penetration of 320 was used as the grease for auxiliary lubrication. The same items as those measured in the example 1 were measured on the obtained specimen. Table 1 shows the results Comparative Example 4

In the composition shown in table 1, a constant velocity universal joint specimen was made in a procedure similar to that of the example 4. But the silicone-based foam stabilizer was not used. The grease B for auxiliary lubrication containing 9 wt % of a thickener and having a penetration of 280 was used as the grease for auxiliary lubrication. The same items as those measured in the example 1 were measured on the obtained specimen. Table 1 shows the results.

Comparative Example 5

In the composition shown in table 1, a constant velocity universal joint specimen was made in a procedure similar to that of the example 6. But the silicone-based foam stabilizer was not used. The grease D for auxiliary lubrication containing 17 wt % of a thickener and having a penetration of 335 was used as the grease for auxiliary lubrication. The same items as those measured in the example 1 were measured on the obtained specimen. Table 1 shows the results

TABLE 1

| | | Example | | | | | | Comparative example | | | | |
|---|---|---|---|---|---|---|---|---|---|---|---|---|
| | | 1 | 2 | 3 | 4 | 5 | 6 | 1 | 2 | 3 | 4 | 5 |
| Mixing amounts of components of foamed lubricant (wt %) | | | | | | | | | | | | |
| (a) Urethane prepolymer | Placcel EP1130 (Daicel Chemical Industries, Ltd.) | 64 | 67 | — | — | 67 | — | 67 | — | 67 | — | — |
| (b) Amine-based hardener | Iharacuamine MT (Ihara Chemical Industry Co., Ltd.) | 3.2 | 3.3 | — | — | 3.3 | — | 3.3 | — | 3.3 | — | — |
| (c) Water | Ion exchange water | 0.5 | 0.5 | 0.5 | 0.5 | 0.5 | 0.5 | 0.5 | 0.5 | 0.5 | 0.5 | 0.5 |

TABLE 1-continued

|  |  | Example | | | | | | Comparative example | | | | |
|---|---|---|---|---|---|---|---|---|---|---|---|---|
|  |  | 1 | 2 | 3 | 4 | 5 | 6 | 1 | 2 | 3 | 4 | 5 |
| (d) Silicone-based foam stabilizer | SRX298 (Dow Corning Toray Co., Ltd) | 0.3 | 0.4 | 0.5 | 0.2 | 0.4 | 0.2 | 0.4 | 0.5 | 0.4 | — | — |
| (e) Urea-based grease | Pyronoc Universal N6C (Nippon Oil Corporation) | 31.7 | 14.2 | — | — | 14.2 | — | 14.2 | — | 14.2 | — | — |
| (f) Isocyanate | Coronate T80 (Nippon Polyurethane Industry Co., Ltd.) | — | — | 8.5 | 8.5 | — | 8.5 | — | 8.5 | — | 8.5 | 8.5 |
| (g) Polyether polyol | Preminol SX4004 (Asahi Glass Co., Ltd.) | — | — | 20 | 20 | — | 20 | — | 20 | — | 20 | 20 |
| (h) Amine-based catalyst | TOYOCAT DM70 (Tosoh Corporation) | 0.3 | 0.4 | 0.5 | 0.5 | 0.4 | 0.5 | 0.4 | 0.5 | 0.4 | 0.5 | 0.5 |
| (i) Lubricating oil | Turbine 100 (Nippon Oil Corporation) | — | 14.2 | 70 | 70.3 | 14.2 | 70.3 | 14.2 | 70 | 14.2 | 70.5 | 70.5 |
| Total |  | 100 | 100 | 100 | 100 | 100 | 100 | 100 | 100 | 100 | 100 | 100 |
| Grease for auxiliary lubrication |  |  |  |  |  |  |  |  |  |  |  |  |
| Grease A Aromatic urea - mineral oil, amount of thickener: 23 wt %, penetration: 270 |  | 3 g | — | 3 g | — | — | — | — | — | — | — | — |
| Grease B Aliphatic/Alicyclic urea - mineral oil, amount of thickener: 9 wt %, penetration: 280 |  | — | 3 g | — | 3 g | — | — | — | — | — | 3 g | — |
| Grease C Aliphatic urea - mineral oil, amount of thickener: 8 wt %, penetration: 320 |  | — | — | — | — | — | — | — | — | 3 g | — | — |
| Grease D Aromatic urea - mineral oil, amount of thickener: 17 wt %, penetration: 335 |  | — | — | — | — | 3 g | 3 g | — | — | — | — | 3 g |
| Open cell ratio (%) |  | 80 | 78 | 65 | 50 | 78 | 50 | 78 | 65 | 78 | 40 | 40 |
| Judgement in durability test |  | ○ | ○ | ○ | ○ | ○ | ○ | x | x | x | x | x |

In the examples 1 through 6, in the durability test conducted by using the constant velocity universal joints, lubricant shortage-caused wear was not recognized, thus favorable results were shown.

INDUSTRIAL APPLICABILITY

The lubrication system of the present invention improves the force of retaining a lubricating component of a foamed lubricant, is capable of minimizing the amount of exudation of the lubricating component which occurs owing to deformation of the foamed lubricant, is capable of compensating for a lubricating function even when the lubricating component exudes insufficiently from the foamed lubricant, and is capable of complying with a demand that the lubrication system has a long life and can be produced at a low cost. Therefore the lubrication system of the present invention can be preferably utilized for various rolling bearings, universal joints, and the like used in various industrial machines, cars, and the like.

The invention claimed is:

1. A universal joint with a lubrication system comprising a foamed lubricant containing a lubricating component in a resin thereof which foams, hardens, and becomes porous; and a grease for auxiliary lubrication which is present together with said foamed lubricant in a portion to be lubricated,
wherein a rotational torque is transmitted owing to engagement between track grooves provided on an outer member and an inner member and torque transmission member; said torque transmission member being adapted to roll along said track grooves to move in an axial direction; and said grease for auxiliary lubrication and said foamed lubricant are present together inside said universal joint;
wherein said universal joint has a boot, said boot being a part that is separate from said foamed lubricant and
wherein said grease for auxiliary lubrication satisfies a condition that (1) a penetration thereof is not less than 175 and less than 285 or that (2) a mixing ratio of a thickener to said grease for auxiliary lubrication is not less than 10 wt % and less than 40 wt %.

2. The universal joint according to claim 1, wherein in said foamed lubricant, said resin which foams, hardens, and becomes porous has rubber-like elasticity; and said lubricating component contained in said resin has an exuding property caused by deformation of a rubber-like elastic substance.

3. The universal joint according to claim 1, wherein said resin which foams, hardens, and becomes porous is polyurethane resin.

4. The universal joint according to claim 1, wherein an open cell ratio of said resin which foams, hardens, and becomes porous is not less than 50%.

5. The universal joint according to claim 1, wherein a foaming magnification of said resin is 1.1 to 100.

6. A universal joint according to claim 1, wherein said grease for auxiliary lubrication is enclosed in at least one portion of said universal joint selected from among a bottom portion of said outer member, a rolling portion, and a sliding portion.

7. A universal joint according to claim 1, wherein said universal joint is a constant velocity universal joint.

* * * * *